(12) United States Patent
Chen et al.

(10) Patent No.: US 8,559,545 B2
(45) Date of Patent: Oct. 15, 2013

(54) CHANNEL INFORMATION FEEDBACK METHOD AND APPARATUS THEREOF

(75) Inventors: Chun-Yao Chen, Taipei (TW); Hsuan-Jung Su, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 383 days.

(21) Appl. No.: 13/097,055

(22) Filed: Apr. 29, 2011

(65) Prior Publication Data

US 2011/0268166 A1 Nov. 3, 2011

Related U.S. Application Data

(60) Provisional application No. 61/329,096, filed on Apr. 29, 2010.

(30) Foreign Application Priority Data

Dec. 30, 2010 (TW) .............................. 99146769 A

(51) Int. Cl.
  *H04B 7/02* (2006.01)
  *H04L 1/02* (2006.01)
(52) U.S. Cl.
  USPC ........... 375/267; 375/260; 455/132; 455/133; 455/137; 455/140; 455/141

(58) Field of Classification Search
  None
  See application file for complete search history.

(56) References Cited

U.S. PATENT DOCUMENTS

| | | | |
|---|---|---|---|
| 2007/0191066 A1* | 8/2007 | Khojastepour et al. | 455/562.1 |
| 2008/0159425 A1* | 7/2008 | Khojastepour et al. | 375/260 |
| 2008/0227495 A1* | 9/2008 | Kotecha et al. | 455/562.1 |
| 2009/0047999 A1* | 2/2009 | Xia et al. | 455/562.1 |

* cited by examiner

*Primary Examiner* — Shuwang Liu
*Assistant Examiner* — Gina McKie
(74) *Attorney, Agent, or Firm* — Jianq Chyun IP Office

(57) ABSTRACT

A channel information feedback method adapted in a receiving end of a multiuser multiple input multiple output (MU MIMO) system has following steps. A subspace matrix and a magnitude matrix related to a transmitting end of the MU MIMO system are obtained according to a channel matrix corresponding to the receiving end. A first quantization is performed on the subspace matrix to generate a quantized subspace matrix. A second quantization is performed on an auxiliary information matrix to generate a quantized auxiliary information matrix, where the auxiliary information matrix is corresponding to the magnitude matrix and a residual subspace matrix, and the residual subspace matrix includes residual subspace information after the first quantization is performed on the subspace matrix. The quantized subspace matrix and the quantized auxiliary information matrix are fed back to the transmitting end through an uplink channel.

33 Claims, 7 Drawing Sheets

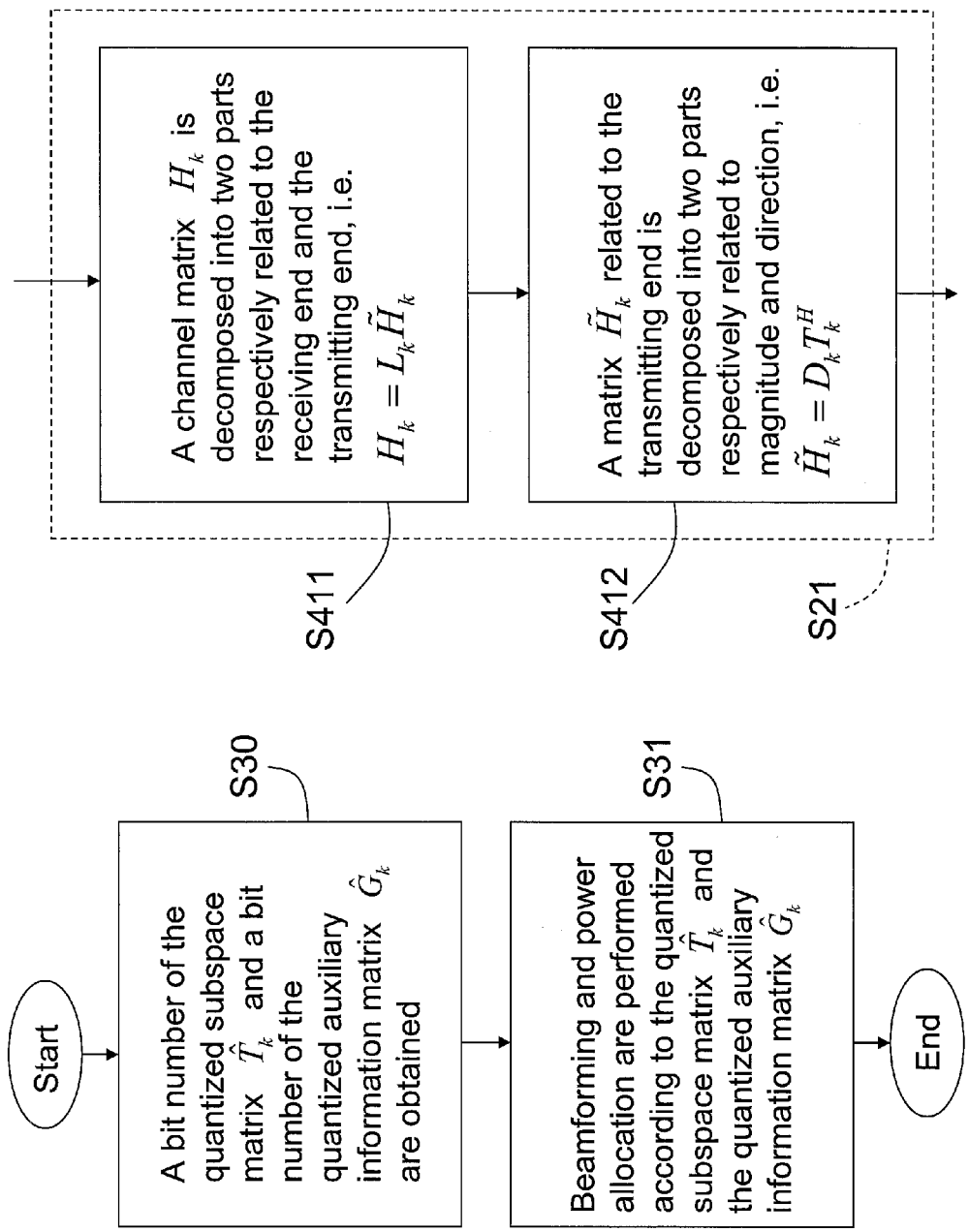

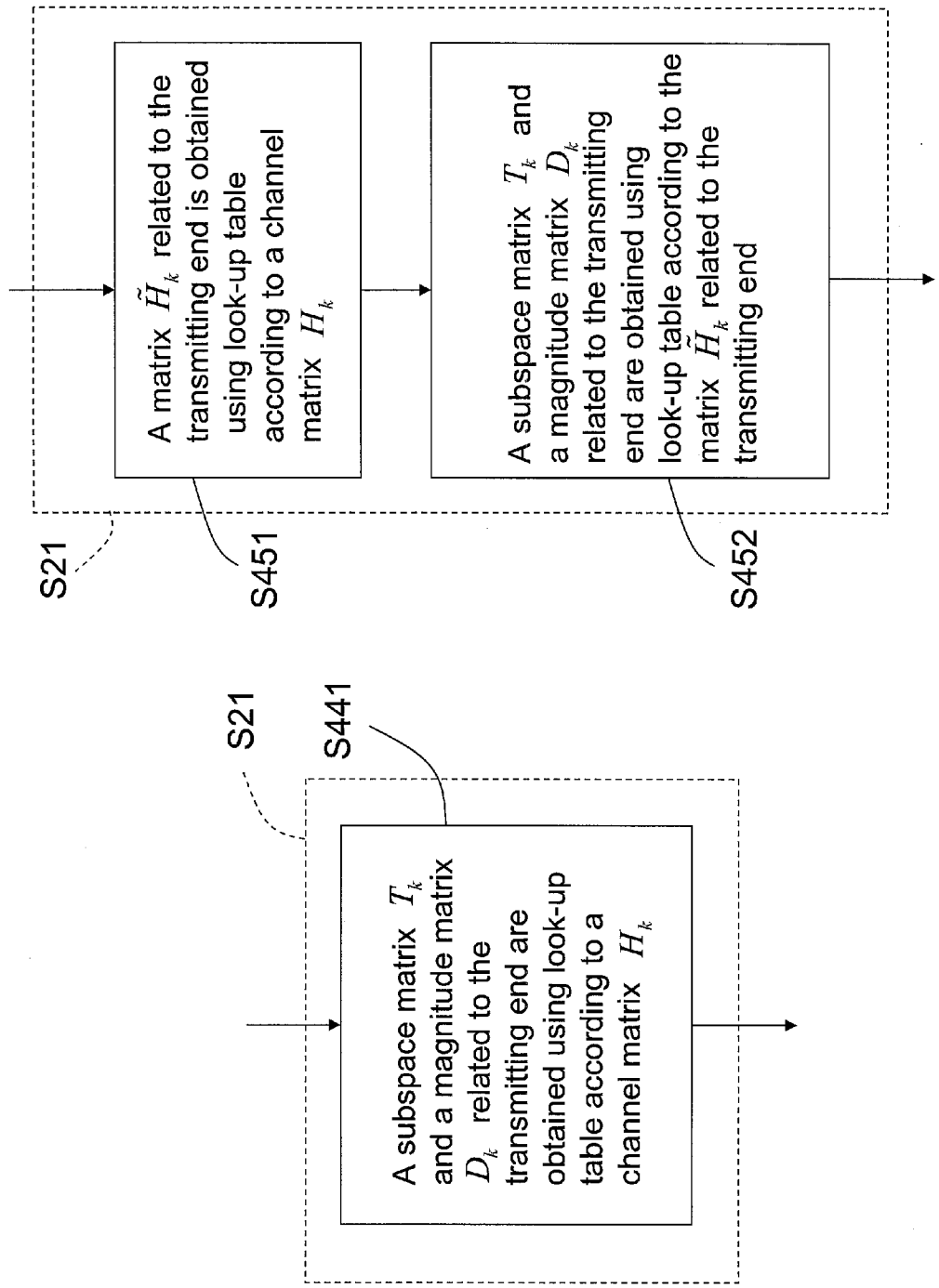

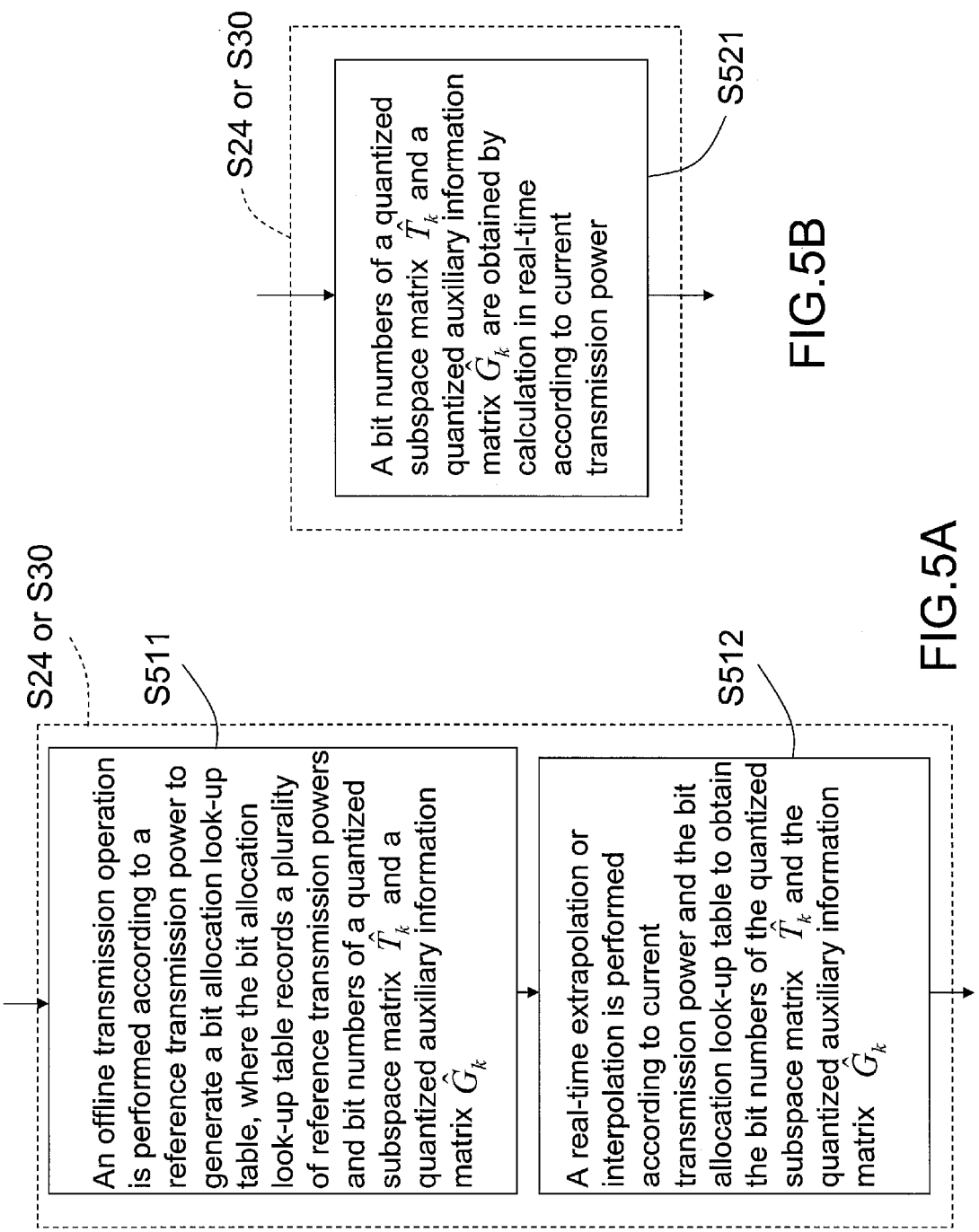

CHANNEL INFORMATION FEEDBACK METHOD AND APPARATUS THEREOF

CROSS-REFERENCE TO RELATED APPLICATION

This application claims the priority benefits of U.S. provisional application Ser. No. 61/329,096, filed on Apr. 29, 2010 and Taiwan application serial no. 99146769, filed on Dec. 30, 2010. The entirety of each of the above-mentioned patent applications is hereby incorporated by reference herein and made a part of this specification.

BACKGROUND

1. Field of the Disclosure

The disclosure relates to a multiuser multiple input multiple output (MU MIMO) system. Particularly, the disclosure relates to a channel information feedback method and an apparatus thereof used for beamforming and power allocation of a MU MIMO system.

2. Description of Related Art

With the development of wireless communication technology, multiple input multiple output (MIMO) systems are widely used to increase transmission capacity and transmission quality of communication systems. The MIMO system can support multiple users to achieve a multiuser MIMO (MU MIMO) system. However, in order to achieve better spatial multiplexing with a high transmission rate, a transmitting end (for example, a base station) has to perform optimal beamforming and power allocation according to channel state. Therefore, a receiving end (for example, a user end) has to measure channel state information (CSI) and feed back the CSI to the transmitting end.

The CSI of the MIMO system can be represented by a matrix having a plurality of complex elements (which is referred to as a CSI matrix hereinafter). The CSI matrix contains a large amount of information, and a magnitude of the information amount thereof relates to the number of antennas (including transmitting antennas and receiving antennas) and the number of users. Therefore, regarding a finite bit rate uplink channel, if the amount of information of the CSI matrix is too large, the uplink channel can be fully occupied.

Presently, some wireless communication standards adopt a codebook-based pre-coding method, by which the receiving end selects a mostly suitable pre-coding matrix from a codebook according to the measured CSI matrix, and feeds back an index thereof to the transmitting end, the transmitting end obtains the pre-coding matrix by looking up the codebook according to the index and pre-codes data to be transmitted, and then transmits data to the receiving end. The pre-coding method only uses a finite bit feedback index; however, by using the predetermined codebook, an optimal transmission performed in an environment with feeding back real-time channel state cannot be achieved, so that system performance is relatively poor.

Generally, the receiving end directly feeds back the CSI matrix, and the transmitting end calculates an optimal beamforming matrix according to the CSI matrix, so as to transmit data to the receiving end to achieve a better performance. A commonly used beamforming technique is a zero-forcing (ZF) beamforming technique, the ZF beamforming technique is used to prevent signals transmitted to a user end by the transmitting end from being influenced by signals transmitted to the other users. Such ZF beamforming technique only requires a direction part of the CSI matrix (which is referred to as a subspace matrix). The transmitting end receives the subspace matrix and performs optimal beamforming on the data to be transmitted, and accordingly transmits data to the receiving end.

The ZF beamforming technique does not require a magnitude part (which is referred to as a magnitude matrix) of the CSI matrix, so that the receiving end is only required to feed back the subspace matrix of the CSI matrix to the transmitting end. However, there are limitations on the number of antennas of the ZF beamforming technique, and when channels corresponding to two users are the same, the transmitting end can only transmit data to one of the users.

Moreover, non-ZF beamforming techniques or other types of the beamforming and power allocation techniques are also provided, and performance of some non-ZF beamforming technique is better than that of the ZF beamforming technique. However, these techniques all require the complete CSI matrix (including the direction part and the magnitude part), so that in case of the finite bit rate of the uplink channel, the receiving end generally uses vector quantization to quantize the whole CSI matrix, and feed back the quantized CSI matrix to the transmitting end.

SUMMARY OF THE DISCLOSURE

In consistence with an exemplary embodiment of the disclosure, there is provided a channel information (CSI matrix) feedback method. The channel information feedback method is adapted in a receiving end of a multiuser multiple input multiple output (MU MIMO) system, and includes the following steps. A subspace matrix and a magnitude matrix related to a transmitting end of the MU MIMO system are obtained according to a channel matrix corresponding to the receiving end. A first quantization is performed on the subspace matrix to generate a quantized subspace matrix. A second quantization is performed on an auxiliary information matrix to generate a quantized auxiliary information matrix, where the auxiliary information matrix is related to the magnitude matrix and a residual subspace matrix, and the residual subspace matrix includes residual subspace information of the subspace matrix remained after the first quantization is performed on the subspace matrix. The quantized subspace matrix and the quantized auxiliary information matrix are fed back to the transmitting end through an uplink channel.

In consistence with an exemplary embodiment of the disclosure, there is provided a channel information feedback method. The channel information feedback method is adapted in a transmitting end of a multiuser multiple input multiple output (MU MIMO) system, and includes the following steps. Power allocation and beamforming are performed on multiple user data to be transmitted to a plurality of users of the MU MIMO system by the transmitting end according to a plurality of quantized subspace matrices and a plurality of quantized auxiliary information matrices received from a plurality of receiving ends of the MU MIMO system, so as to generate a transmitting signal. The transmitting signal is transmitted to the receiving ends. wherein each one of the receiving ends obtains a subspace matrix and a magnitude matrix related to the transmitting end according to a channel matrix corresponding to the receiving end, and performs a first quantization and a second quantization on the subspace matrix and an auxiliary information matrix to generate a quantized subspace matrix and a quantized auxiliary information matrix, the receiving ends feed back the quantized subspace matrices and the quantized auxiliary information matrices to the transmitting end through an uplink channel, wherein the auxiliary information matrix is related to the magnitude matrix and a residual subspace matrix, and the residual subspace matrix includes residual subspace information of the subspace matrix remained after the first quantization is performed on the subspace matrix.

In consistence with an exemplary embodiment of the disclosure, there is provided a channel information feedback apparatus. The channel information feedback apparatus is adapted in a receiving end of a multiuser multiple input multiple output (MU MIMO) system, and includes a transmitting end-related extractor device, a first quantizer, a second quantizer and a feedback signal transmitter. The transmitting end-related extractor device is configured for obtaining a subspace matrix and a magnitude matrix related to a transmitting end of the MU MIMO system according to a channel matrix corresponding to the receiving end. The first quantizer performs a first quantization on the subspace matrix to generate a quantized subspace matrix. The second quantizer performs a second quantization on an auxiliary information matrix to generate a quantized auxiliary information matrix, where the auxiliary information matrix is related to the magnitude matrix and a residual subspace matrix, and the residual subspace matrix has residual subspace information of the subspace matrix remained after the first quantization is performed on the subspace matrix. The feedback signal transmitter is configured for feeding back the quantized subspace matrix and the quantized auxiliary information matrix to the transmitting end through an uplink channel.

In consistence with an exemplary embodiment of the disclosure, there is provided a transmitting end. The transmitting end is configured in a multiuser multiple input multiple output (MU MIMO) system, and includes a feedback signal receiver, a power allocation device and a beamforming device. The feedback signal receiver is configured for receiving a plurality of quantized subspace matrices and a plurality of quantized auxiliary information matrices fed back by a plurality of receiving ends of multiple users of the MU MIMO system through an uplink channel. The power allocation device is configured for performing power allocation on multiple user data to be transmitted to the multiple users of the MU MIMO system by the transmitting end according to the quantized subspace matrices and the auxiliary information matrices. The beamforming device is configured for performing beamforming on the multiple power-allocated user data according to the quantized subspace matrices and the quantized auxiliary information matrices, so as to generate a transmitting signal to the receiving ends. wherein each one of the receiving ends obtains a subspace matrix and a magnitude matrix related to the transmitting end according to a channel matrix corresponding to the receiving end, and performs a first quantization and a second quantization on the subspace matrix and an auxiliary information matrix to generate a quantized subspace matrix and a quantized auxiliary information matrix, the receiving ends feed back the quantized subspace matrices and the quantized auxiliary information matrices to the transmitting end through the uplink channel, wherein the auxiliary information matrix is related to the magnitude matrix and a residual subspace matrix, and the residual subspace matrix has residual subspace information of the subspace matrix remained after the first quantization is performed on the subspace matrix.

In consistence with an exemplary embodiment of the disclosure, there is provided a multiuser multiple input multiple output (MU MIMO) system including a transmitting end and a plurality of receiving ends. The receiving ends are corresponding to multiple users of the MU MIMO system, where each one of the receiving ends includes a channel information feedback apparatus, and the channel information feedback apparatus includes a transmitting end-related extractor device, a first quantizer, a second quantizer and a feedback signal transmitter. The transmitting end-related extractor device is configured for obtaining a subspace matrix and a magnitude matrix related to the transmitting end of the MU MIMO system according to a channel matrix corresponding to the receiving end. The first quantizer performs a first quantization on the subspace matrix to generate a quantized subspace matrix. The second quantizer performs a second quantization on an auxiliary information matrix to generate a quantized auxiliary information matrix, where the auxiliary information matrix is related to the magnitude matrix and a residual subspace matrix, and the residual subspace matrix includes residual subspace information of the subspace matrix remained after the first quantization is performed on the subspace matrix. The feedback signal transmitter is configured for feeding back the quantized subspace matrix and the quantized auxiliary information matrix to the transmitting end through an uplink channel. The transmitting end includes a feedback signal receiver, a power allocation device and a beamforming device. The feedback signal receiver is configured for receiving the quantized subspace matrices and the quantized auxiliary information matrices through the uplink channel. The power allocation device is configured for performing power allocation on multiple user data to be transmitted to the multiple users of the MU MIMO system by the transmitting end according to the quantized subspace matrices and the quantized auxiliary information matrices. The beamforming device is configured for performing beamforming on the multiple power-allocated user data according to the quantized subspace matrices and the quantized auxiliary information matrices, so as to generate a transmitting signal to the receiving ends.

According to the above descriptions, the channel information feedback method and the apparatus thereof provided by the exemplary embodiments of the disclosure can be used in the MU MIMO system having a finite bit rate uplink channel, so that the transmitting end of the MU MIMO system can perform power allocation and beamforming on the user data to be transmitted to all of the users according to the fed back quantized CSI.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 3 is a flowchart illustrating a channel information feedback method used in a transmitting end according to an exemplary embodiment of the disclosure.

FIG. 4A to FIG. 4D are flowcharts of methods for obtaining a subspace matrix $T_k$ and a magnitude matrix $D_k$ according to an exemplary embodiment of the disclosure.

FIG. 5A and FIG. 5B are flowchart illustrating methods of obtaining bit numbers $B_T$ and $B_G$ according to an exemplary embodiment of the disclosure.

DETAILED DESCRIPTION OF DISCLOSED EMBODIMENTS

Figure 1:
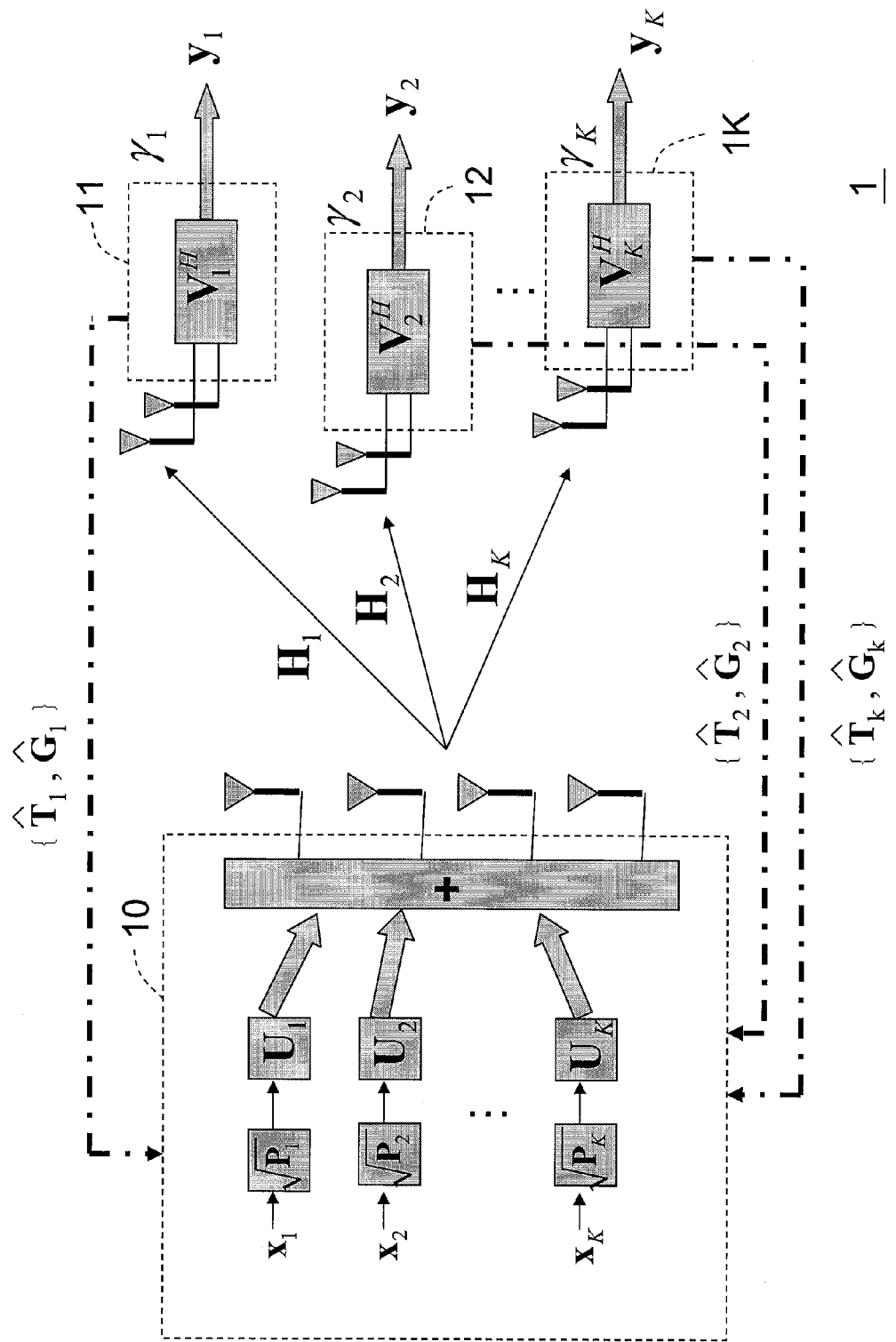
FIG. 1 is a block diagram of a multiuser multiple input multiple output (MU MIMO) system according to an exemplary embodiment of the disclosure.

Referring to FIG. 1, FIG. 1 is a block diagram of a multiuser multiple input multiple output (MU MIMO) system according to an exemplary embodiment of the disclosure. A MU MIMO system 1 includes a transmitting end 10 and receiving ends 11-1K corresponding to a plurality of users. The MU MIMO system 1 includes K users, and each of the receiving ends 11-1K has $N_r$ receiving antennas. The transmitting end 10 has $N_t$ transmitting antennas (for example, $N_t = KN_r$), and channel responses between the transmitting end 10 and the receiving ends 11-1K can be respectively represented by channel matrices $H_1$-$H_K$. If k belongs to 1 to K, a channel matrix $H_k$ is a complex matrix of $N_r \times N_t$. A plurality of elements of the channel matrix $H_k$ are random variables each representing the channel between a pair of transmitting and receiving antennas. Target signal-to-noise ratios of the first to the $K^{th}$ users are respectively represented by $\gamma_1, \gamma_2, \ldots, \gamma_K$.

The receiving ends 11-1K may transmit quantized subspace matrices $\hat{T}_1$-$\hat{T}_K$ and quantized auxiliary information matrices $\hat{G}_1$-$\hat{G}_K$ to the transmitting end 10 through a finite bit rate uplink channel. Regarding k belonging to 1 to K, the receiving end 1k may extract a matrix $\tilde{H}_k$ related to the transmitting end from the channel matrix $H_k$, and decomposes the transmitting end-related matrix $\tilde{H}_k$ into a magnitude matrix $D_k$ and a subspace matrix $T_k$ (or a direction-related matrix). Then, the receiving end 1k respectively quantizes the subspace matrix $T_k$ and an auxiliary information matrix $G_k$ according to different quantization criterions to obtain the quantized subspace matrix $\hat{T}_k$ and the quantized auxiliary information matrix $\hat{G}_k$, where the auxiliary information matrix $G_k$ is related to the magnitude matrix $D_k$ and information of a residual subspace matrix. Then, the receiving end 1k feeds back the quantized subspace matrix $\hat{T}_k$ and the quantized auxiliary information matrix $\hat{G}_k$ to the transmitting end 10 through the finite bit rate uplink channel. In other exemplary embodiments, the magnitude matrix $D_k$ and the subspace matrix $T_k$ can also be quantized according to a same quantization criterion.

By decomposing the channel matrix $H_k$ (for example, using the singular value decomposition), the channel matrix $H_k$ can be decomposed into a matrix $L_k$ related to the receiving end and a matrix $\tilde{H}_k$ related to the transmitting end, i.e., $H_k = L_k \tilde{H}_k$, where the matrix $L_k$ related to the receiving end satisfies $L_k^H L_k = I_{N_r}$. Similarly, by decomposing the transmitting end-related matrix $\tilde{H}_k$, the transmitting end-related matrix $\tilde{H}_k$ can be decomposed into a subspace matrix $T_k$ and a magnitude matrix $D_k$, i.e., $\tilde{H}_k = D_k T_k$, where the magnitude matrix $D_k$ is a complex matrix of $N_r \times N_y$, and the subspace matrix $T_k$ is a complex matrix of $N_y \times N_y$. The quantized auxiliary information matrix $\hat{G}_k$ is obtained by quantizing the magnitude matrix $D_k$ and the information of the residual subspace matrix. Therefore, the transmitting end-related matrix $\tilde{H}_k$ can be regarded as being composed of the subspace matrix $T_k$ and the auxiliary information matrix $G_k$, where the auxiliary information matrix $G_k$ is a complex matrix of $N_r \times N_y$. The information of the residual subspace matrix is information of the remained direction matrix after the subspace matrix $T_k$ is quantized.

The transmitting end 10 may perform power allocation and beamforming according to the quantized subspace matrices $\hat{T}_1$-$\hat{T}_K$ and the quantized auxiliary information matrices $\hat{G}_1$-$\hat{G}_K$, the power allocation and the beamforming can be optimized power allocation and beamforming. The transmitting end 10 respectively multiplies user data $x_1$-$x_k$ to be transmitted to the first to the $K^{th}$ users by square root of powers $\sqrt{P_1}$-$\sqrt{P_K}$ (which is referred to as powers below) to accomplish the power allocation, where the user data $x_1$-$x_k$ are all complex matrices of $N_r \times 1$. Then, the transmitting end 10 further multiplies the user data $x_1$-$x_k$ multiplied with the powers $\sqrt{P_1}$-$\sqrt{P_K}$ by beamforming matrices $U_1$-$U_k$ to accomplish the beamforming. In this way, a transmitting signal transmitted by the transmitting end 10 can be represented as:

$$\sum_{i=1}^{K} U_i \sqrt{P_i}\, x_i \in C^{N_t \times 1},\ x_i \in C^{N_r \times 1},\ U_i \in C^{N_t \times N_r}$$

Regarding the receiving end 1k of a $k^{th}$ user, a receiving signal $r_k$ thereof can be represented as:

$$r_k = H_k \sum_{i=1}^{K} U_i \sqrt{P_i}\, x_i + n_k \in C^{N_r \times 1}$$

where, the receiving signal $r_k$ is a complex matrix of $N_r \times 1$, the noise matrix $n_k$ is a complex matrix of $N_r \times 1$. Then, the receiving end 1k performs a beamforming filtering to the receiving signal $r_k$ according to the channel matrix $H_k$, and the beamforming filtering can be an optimized beamforming filtering. The receiving end 1k multiplies the receiving signal $r_k$ by a beamforming filtering matrix $V_k^H$ to obtain user data $y_k$ of the $k^{th}$ user, and the user data $y_k$ is represented as follows:

$$y_k = V_k^H \left( H_k \sum_{i=1}^{K} U_i \sqrt{P_i}\, x_i + n_k \right)$$

$$= V_k^H H_k U_k \sqrt{P_k}\, x_k + V_k^H H_k \sum_{i=1, i \neq k}^{K} U_i \sqrt{P_i}\, x_i + V_k^H H_k n_k$$

where, the user data $y_k$ is a complex matrix of $N_r \times 1$, the beamforming filtering matrix $V_k^H$ is a complex matrix of $N_r \times N_r$. Ideally, in case that the noises and interferences are all removed, the user data $y_k$ is equivalent to the user data $x_k$.

The MU MIMO system 1 can be the long term evolution advanced technology (LTE-A) or the worldwide interoperability for microwave access (WiMAX) system that requires to feed back a large amount of channel state information (CSI). The receiving ends 11-1K can be mobile stations or user equipments, etc., and the transmitting end 10 can be a base station or a relay station, etc. Overall, types of the receiving ends 11-1K and the transmitting end 10 are not limited by the disclosure.

Figure 2:
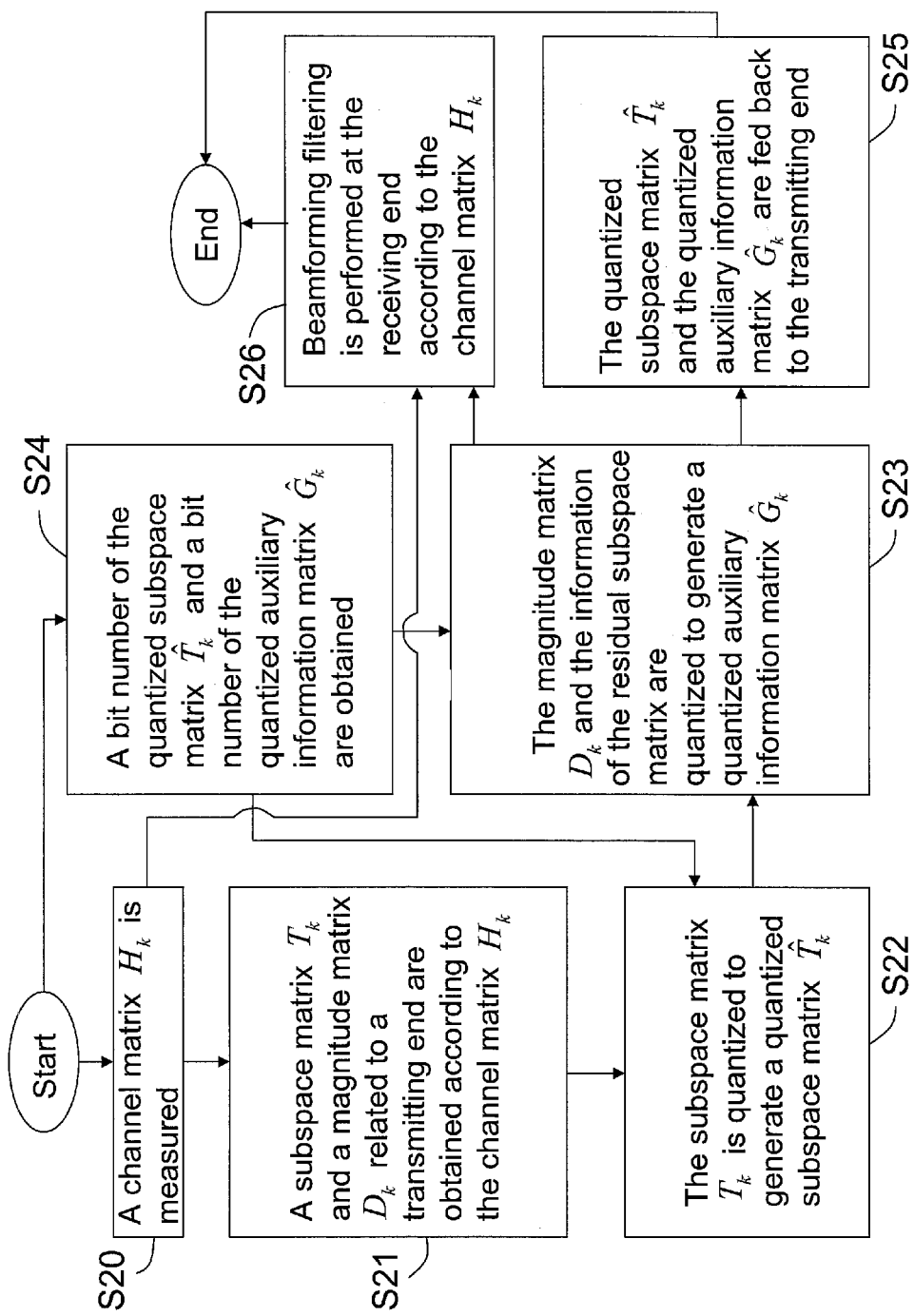
FIG. 2 is a flowchart illustrating a channel information feedback method used in a receiving end according to an exemplary embodiment of the disclosure.
Figures 6, 7:
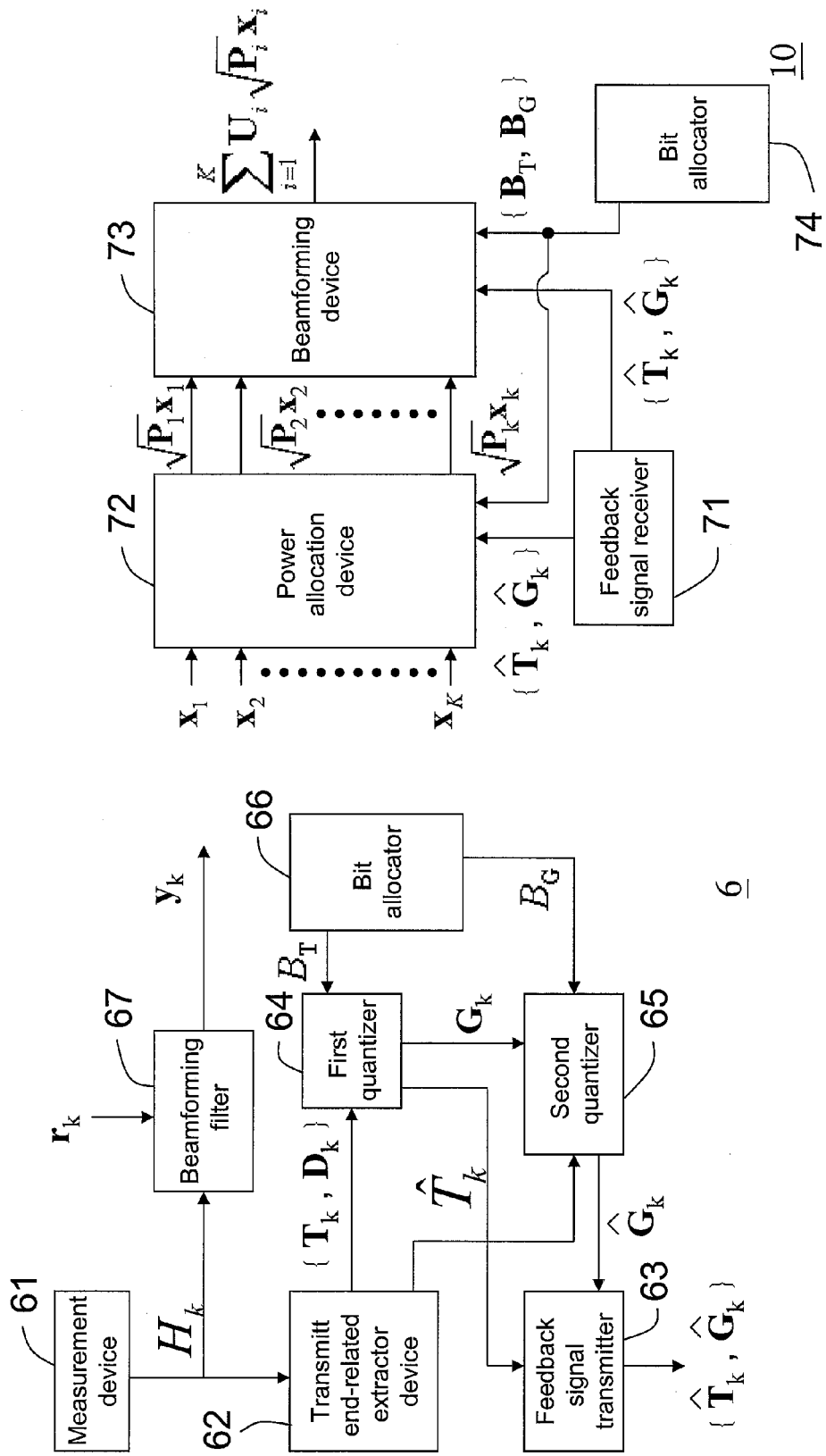
FIG. 6 is a block diagram of a channel information feedback apparatus according to an exemplary embodiment of the disclosure.
FIG. 7 is a block diagram of a transmitting end according to an exemplary embodiment of the disclosure.

Referring to FIG. 2 and FIG. 6, FIG. 2 is a flowchart illustrating a channel information feedback method used in the receiving end according to an exemplary embodiment of the disclosure. FIG. 6 is a block diagram of a channel information feedback apparatus according to an exemplary embodiment of the disclosure. Steps S20-S26 of FIG. 2 are executed at the receiving end $1k$ of the MU MIMO system 1 of FIG. 1. The channel information feedback apparatus 6 of the receiving end $1k$ includes a measurement device 61, a transmitting end-related extractor device 62, a feedback signal transmitter 63, a first quantizer 64, a second quantizer 65, a bit allocator 66 and a beamforming filter 67. Various devices of the channel information feedback apparatus 6 of the receiving end $1k$ can be implemented by hardware circuits or implemented by software programs.

In step S20, the measurement device 61 measures the channel matrix $H_k$ of the $k^{th}$ user. In step S24, the bit allocator 66 obtains a bit number $B_T$ of the quantized subspace matrix $\hat{T}_K$ and a bit number $B_G$ of the quantized auxiliary information matrix $\hat{G}_K$, where a sum of the bit numbers $B_T$ and $B_G$ is equal to a quantized total bit number B, and the quantized total bit number B is a bit number allowed to be transmitted in the finite bit rate uplink channel The steps S24 and S20 can be simultaneously executed, or the step S24 can be executed before execution of the step S22. In another exemplary embodiment, if the MU MIMO system 1 has already defined the bit numbers $B_T$ and $B_G$, the step S24 can be omitted. In another exemplary embodiment, the bit allocator 66 of the channel information feedback apparatus 6 can be removed, and the bit numbers $B_T$ and $B_G$ can be determined by the transmitting end 10, and information of the bit numbers $B_T$ and $B_G$ can be transmitted to the receiving end $1k$ through a reliable downlink channel.

Then, in step S21, the transmitting end-related extractor device 62 obtains the subspace matrix $T_k$ and the magnitude matrix $D_k$ related to the transmitting end according to the channel matrix $H_k$. Then, in step S22, the first quantizer 64 performs $B_T$ bit quantization on the subspace matrix $T_k$ to generate a quantized subspace matrix $\hat{T}_K$. In step S23, the second quantizer 65 performs a $B_G$ bit quantization on the magnitude matrix $D_k$ and the information of the residual subspace matrix (i.e., quantization of the auxiliary information matrix $G_k$) to generate the quantized auxiliary information matrix $\hat{G}_K$.

In one exemplary embodiment, the objective is to quantize the subspace spanned by the columns of $T_k$, and $\hat{T}_K$ denotes the quantized subspace. The relation can be described as $$T_k = \hat{T}_k \hat{T}_k^H T_k + (I - \hat{T}_k \hat{T}_k^H) T_k$$
$$= \hat{T}_k \hat{Q}_k^H \cos(\Theta_k) Q_k^H + \hat{T}_k^\perp \sin(\Theta_k) Q_k$$

where $\hat{T}_k \hat{T}_k^H = \hat{Q}_k^H \cos(\Theta_k) Q_k^H$ by SVD decomposition, and $\hat{T}_K$ is a $N_t \times N_r$ unitary matrix whose columns are orthogonal to those of $T_k \cdot \cos(\Theta_k) = \text{diag}\{[\cos\theta_1 \ldots \cos\theta_{N_r}]\}$ and $\sin(\Theta_k) = \text{diag}\{[\sin\theta_1 \ldots \sin\theta_{N_r}]\}$, where $Q_k$ is a matrix referred to as the uplink power allocation and the $\theta_j$'s are the principal angles between the two subspaces spanned by the columns of the matrices $T_k$ and $\hat{T}_K$.

In another exemplary embodiment, $G_k$ as a $N_r \times N_r$ matrix shown below:

$$G_k = \sigma_n^2 (\hat{Q}_k \cos(\Theta_k) Q_k^H)^{-H} D_k^{-2} (\hat{Q}_k \cos(\Theta_k) Q_k^H)^{-1}$$

which contains the channel magnitude information and the remaining information of $T_k$ after the subspace is quantized. Define $\hat{G}_K$ as the quantized $\hat{G}_k$, and $\Delta G_k = G_k - \hat{G}_k$. Consequently, the channel feedback method of the disclosure decomposes the new CSI (Channel State Information) into two parts, $T_k$ and $G_k$, then the $T_k$ and the $G_k$ are quantized as $\hat{T}_K$ and $\hat{G}_K$. As a result, the performance of user k with quantized CSI is given as follows:

$$\overline{SINR}_{k,quan}^{DL}/\gamma_k =$$
$$\frac{1}{N_r \gamma_k} tr\left\{\left[(\hat{T}_k + \hat{B}_k)^H \sum_{j \neq k} \hat{U}_j \hat{P}_j \hat{U}_j^H (\hat{T}_k + \hat{B}_k) + \hat{G}_k + \Delta G_k\right]^{-1} (\hat{T}_k + \hat{B}_k)^H\right.$$
$$\left. \hat{U}_k \hat{P}_k \hat{U}_k^H (\hat{T}_k + \hat{B}_k)\right\}$$

where $\hat{B}_k = \hat{T}_k^\perp \tan(\Theta_k) \hat{Q}_k^H$ is defined. The beamforming filters and power allocation matrices are denoted as $\hat{U}_k$ and $\hat{P}_k$ for k=1, 2 . . . . K. In this way, only the quantization error of the spanned subspace is multiplied with power and affects the performance in different order depending on the power, though the error of $G_k$ does not. Therefore, the channel information feedback method allocates the quantization bits to the two parts according to the system SNR adaptively.

In step S25, the feedback signal transmitter 63 feeds back the quantized subspace matrix $\hat{T}_K$ and the quantized auxiliary information matrix $\hat{G}_K$ to the transmitting end 10 through an uplink channel. In step S26, the beamforming filter 67 performs beamforming filtering on the receiving signal $r_k$ according to the channel matrix $H_k$ to obtain the user data $y_k$ of the $k^{th}$ user. The step S26 is executed after execution of the step S20.

Referring to both FIG. 3 and FIG. 7, FIG. 3 is a flowchart illustrating a channel information feedback method used in the transmitting end according to an exemplary embodiment of the disclosure. FIG. 7 is a block diagram of a transmitting end according to an exemplary embodiment of the disclosure. The transmitting end 10 includes a feedback signal receiver 71, a power allocation device 72, a beamforming device 73 and a bit allocator 74. Various devices of the transmitting end 10 can be implemented by hardware circuits, or can be implemented by software programs.

In step S30, the bit allocator 74 obtains the bit number $B_T$ of the quantized subspace matrix $\hat{T}_K$ and the bit number $B_G$ of the quantized auxiliary information matrix $\hat{G}_K$. In another exemplary embodiment, if the MU MIMO system 1 has already defined the bit numbers $B_T$ and $B_G$, the step S30 can be omitted. In another exemplary embodiment, the bit allocator 74 of the transmitting end 10 can be removed, and the bit numbers $B_T$ and $B_G$ can be determined by the receiving end $1k$, and information of the bit numbers $B_T$ and $B_G$ can be transmitted to the transmitting end 10 through a reliable uplink channel.

Then, in step S31, the feedback signal receiver 71 forwards the received quantized subspace matrices $\hat{T}_1$-$\hat{T}_K$ and the quantized auxiliary information matrices $\hat{G}_1$-$\hat{G}_K$ to the power allocation device 72 and the beamforming device 73. The power allocation device 72 and the beamforming device 73 perform power allocation and beamforming on the user data $x_1$-$x_k$ to be transmitted. The power allocation device 72 obtains information of the magnitude matrix $D_k$ and the auxiliary information matrix $G_k$ according to the quantized subspace matrices $T_1$-$T_K$, the quantized auxiliary information matrices $\hat{G}_1$-$\hat{G}_K$ and the bit numbers $B_T$ and $B_G$ thereof, and accordingly allocates powers $P_1$-$P_k$ to the user data $x_1$-$x_k$. The beamforming device 73 obtains information of the magnitude matrix $D_k$ and the auxiliary information matrix $G_k$ according to the quantized subspace matrices $\hat{T}_1$-$\hat{T}_K$, the quantized auxiliary information matrices $\hat{G}_1$-$\hat{G}_K$ and the bit numbers $B_T$ and $B_G$ thereof, and accordingly performs beamforming on the power-allocated user data $\sqrt{P_1}x_1$-$\sqrt{P_K}x_k$ to generate a transmitting signal.

The step S21 of FIG. 2 has following several implementations. Referring to FIG. 4A to FIG. 4D, FIG. 4A to FIG. 4D are flowcharts of methods for obtaining the subspace matrix $T_k$ and the magnitude matrix $D_k$ according to an exemplary embodiment of the disclosure.

Referring to FIG. 4A, in the present exemplary embodiment, the transmitting end-related extractor device 62 includes a matrix decomposition unit. In step S411, the matrix decomposition unit decomposes the channel matrix $H_k$ into the matrix $L_k$ related to the receiving end and the matrix $\tilde{H}_k$ related to the transmitting end, i.e., $H_k = L_k\tilde{H}_k$. Then, in step S412, the matrix decomposition unit decomposes the matrix $\tilde{H}_k$ related to the transmitting end into the subspace matrix $T_k$ and the magnitude matrix $D_k$, i.e., $\tilde{H}_k = D_kT_k$.

Figure 4B:
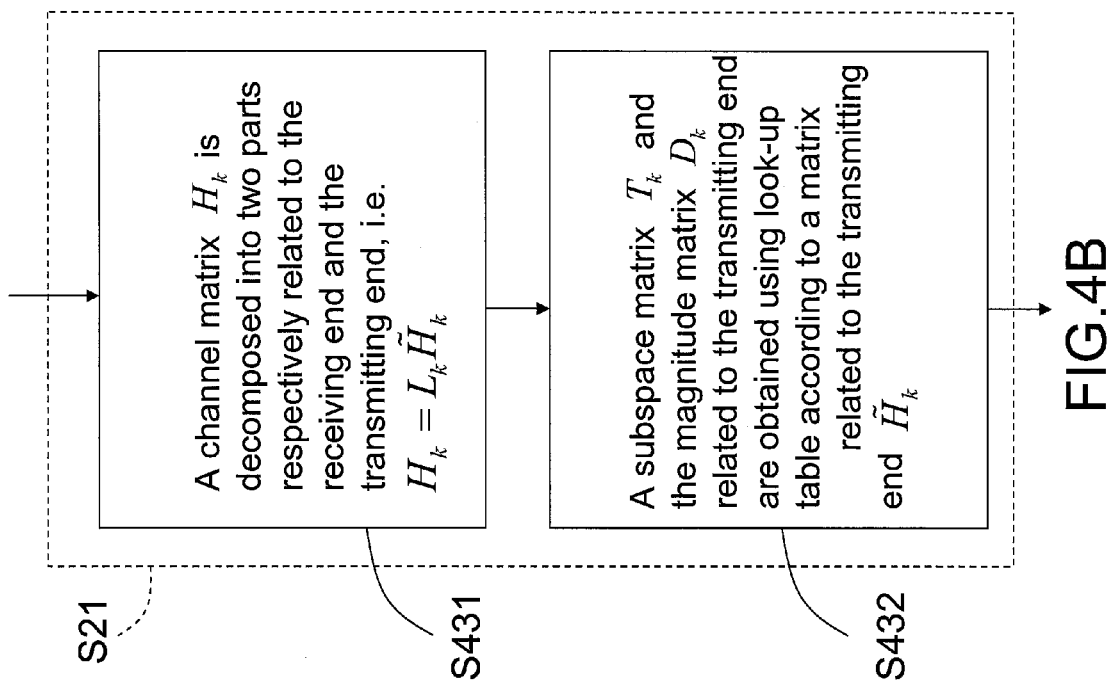

Referring to FIG. 4B, in the present exemplary embodiment, the transmitting end-related extractor device 62 includes a transmitting end-related matrix operation unit, an extrapolation operation unit, an interpolation operation unit and a matrix decomposition unit, where the transmitting end-related matrix operation unit calculates a plurality of transmitting end-related matrices $\hat{H}'_k$ and a plurality of corresponding subspace matrices $T'_k$ and a plurality of corresponding magnitude matrices $D'_k$ ($\hat{H}'_k = D'_kT'_k$) according to the statistics of the channel, and records the transmitting end-related matrices $\hat{H}'_k$, the corresponding subspace matrices $T'_k$ and the corresponding magnitude matrices $D'_k$ in a matrix look-up table. The step S431 is the same to the step S411, so that a detailed description thereof is not repeated. In step S432, the extrapolation operation unit (and/or the interpolation operation unit) finds whether the transmitting end-related matrix $\hat{H}'_k$ equal to the transmitting end-related matrix $\tilde{H}_k$ existing in a transmitting end-related matrix look-up table, where if yes, the subspace matrix $T'_k$ and the magnitude matrix $D'_k$ corresponding to the transmitting end-related matrix $\hat{H}'_k$ are directly output as the subspace matrix $T_k$ and the magnitude matrix $D_k$; and if not, the extrapolation operation unit (and/or the interpolation operation unit) searches a plurality of the subspace matrices $T'_k$ and a plurality of the magnitude matrices $D'_k$ corresponding to a plurality of the transmitting end-related matrices $\hat{H}'_k$ closest to the transmitting end-related matrix $\tilde{H}_k$ in the transmitting end-related matrix look-up table, and outputs the searching results as the subspace matrices $T_k$ and the magnitude matrices $D_k$.

The disclosure is not limited to the aforementioned exemplary embodiments, and in other embodiments, it is not necessary to find the transmitting end-related matrices $\hat{H}'_k$ equal to the transmitting end-related matrix $\tilde{H}_k$ from the matrix look-up table, or find a plurality of the subspace matrices $T'_k$ and the magnitude matrices $D'_k$ corresponding to a plurality of the transmitting end-related matrices $\hat{H}'_k$ closest to the transmitting end-related matrix $\tilde{H}_k$ from the matrix look-up table, and extrapolation and/or interpolation can be achieved through direct calculation. Namely, in the step S432, the extrapolation operation unit (and/or the interpolation operation unit) directly calculates whether the transmitting end-related matrices $\hat{H}'_k$ equal to the transmitting end-related matrix $\tilde{H}_k$ exists, where if yes, the subspace matrix $T'_k$ and the magnitude matrix $D'_k$ corresponding to the transmitting end-related matrix $\hat{H}'_k$ are directly output as the subspace matrix $T_k$ and the magnitude matrix $D_k$; and if not, the extrapolation operation unit (and/or the interpolation operation unit) calculates a plurality of the subspace matrices $T'_k$ and a plurality of the magnitude matrices $D'_k$ corresponding to a plurality of the transmitting end-related matrices $\hat{H}'_k$ closest to the transmitting end-related matrix $\tilde{H}_k$, and outputs the calculating results as the subspace matrices $T_k$ and the magnitude matrices $D_k$.

The disclosure is not limited to the aforementioned exemplary embodiments, and in other embodiments, it is not necessary to use the extrapolation operation unit (and/or the interpolation operation unit) to find the transmitting end-related matrices $\hat{H}'_k$ equal to the transmitting end-related matrix $\tilde{H}_k$ in the matrix look-up table, or find a plurality of the subspace matrices $T'_k$ and the magnitude matrices $D'_k$ corresponding to a plurality of the transmitting end-related matrices $\hat{H}'_k$ relatively closed to the transmitting end-related matrix $\tilde{H}_k$ in the matrix look-up table. Namely, in the step S432, it is found whether the transmitting end-related matrices $\hat{H}'_k$ equal to the transmitting end-related matrix $\tilde{H}_k$ existing in the matrix look-up table, where if yes, the subspace matrix $T'_k$ and the magnitude matrix $D'_k$ corresponding to the transmitting end-related matrix $\hat{H}'_k$ are directly output as the subspace matrix $T_k$ and the magnitude matrix $D_k$; and if not, a plurality of the subspace matrices $T'_k$ and the magnitude matrices $D'_k$ corresponding to a plurality of the transmitting end-related matrices $\hat{H}'_k$ closest to the transmitting end-related matrix $\tilde{H}_k$ are searched in the matrix look-up table, and the searching results are output as the subspace matrices $T_k$ and the magnitude matrices $D_k$.

Referring to FIG. 4C, in the present exemplary embodiment, the transmitting end-related extracting device 62 includes a channel matrix operation unit and a comparison operation unit, where the channel matrix operation unit calculates a plurality of channel matrices $H'_k$ and a plurality of the corresponding subspace matrices $T'_k$ and the magnitude matrices $D'_k$ according to the information fed back by the receiving end, and records the channel matrices $H'_k$ and the corresponding subspace matrices $T'_k$ and the magnitude matrices $D'_k$ in a channel matrix look-up table. In step S441, it is found whether a channel matrix $H'_k$ equal to the channel matrix $H_k$ existing in the channel matrix look-up table, where if yes, the subspace matrix $T'^k$ and the magnitude matrix $D'_k$ corresponding to the channel matrix $H'_k$ are directly output as the subspace matrix $T_k$ and the magnitude matrix $D_k$; and if not, the comparison operation unit is configured to search a plurality of the subspace matrices $T'_k$ and the magnitude matrices $D'_k$ corresponding to the channel matrix $H'_k$ closest to the channel matrix $H_k$ in the channel matrix look-up table, and the searching results are output as the subspace matrices $T_k$ and the magnitude matrices $D_k$.

The disclosure is not limited to the aforementioned exemplary embodiments, and in other embodiments, it is not necessary to find the channel matrix $H'_k$ equal to the channel matrix $H_k$ in the channel matrix look-up table, or find a plurality of the subspace matrices $T'_k$ and the magnitude matrices $D'_k$ corresponding to the channel matrix $H'_k$ closest to the channel matrix $H_k$ in the channel matrix look-up table, and extrapolation and/or interpolation can be achieved through direct calculation. Namely, in the step S441, an extrapolation operation unit (and/or an interpolation operation unit) is configured to directly calculate whether the channel matrix $H'_k$ equal to the channel matrix $H_k$ exists, where if yes, the subspace matrix $T'_k$ and the magnitude matrix $D'_k$ corresponding to the channel matrix $H'_k$ are directly output as the subspace matrix $T_k$ and the magnitude matrix $D_k$; and if not, the extrapolation operation unit (and/or the interpolation operation unit) calculates a plurality of the subspace matrices $T'_k$ and the magnitude matrices $D'_k$ corresponding to the channel matrix H'$_k$ closest to the channel matrix H$_k$, and outputs the calculating results as the subspace matrices T$_k$ and the magnitude matrices D$_k$.

Referring to FIG. 4D, in the present exemplary embodiment, the transmitting end-related extracting device 62 includes a channel matrix operation unit, a transmitting end-related matrix operation unit and a comparison operation unit, where the channel matrix operation unit calculates a plurality of channel matrices H'$_k$ and a plurality of the corresponding transmitting end-related matrices $\tilde{H}'_k$ according to the information fed back by the receiving end, and records the channel matrices H'$_k$ and the corresponding transmitting end-related matrices $\tilde{H}'_k$ in a channel matrix look-up table. The matrix operation unit calculates a plurality of transmitting end-related matrices $\tilde{H}'_k$, a plurality of the corresponding subspace matrices T'$_k$ and the magnitude matrices D'$_k$, and records these matrices in a transmitting end-related matrix look-up table (step S451). The step S452 is the same to the step S432, to that detailed descriptions thereof are not repeated.

Implementations of the step S24 of FIG. 2 or the step S30 of FIG. 3 are described as follows. Referring to FIG. 5A and FIG. 5B, FIG. 5A and FIG. 5B are flowchart illustrating methods of obtaining the bit numbers B$_T$ and B$_G$ according to an exemplary embodiment of the disclosure.

Referring to FIG. 5A, in the present exemplary embodiment, the bit allocator 66 or the bit allocator 74 includes an offline operation unit, a bit allocation look-up table and an extrapolation and/or interpolation operation unit. In step S511, the offline operation unit performs an offline transmission operations according to reference transmission powers to generate the bit allocation look-up table, where the bit allocation look-up table records a plurality of reference transmission powers and a plurality of corresponding bit numbers B'$_T$ and B'$_G$. In step S512, it is found whether the current transmission power equal to a reference transmission power existing in the bit allocation look-up table, where if yes, the bit numbers B'$_T$ and B'$_G$ corresponding to the reference transmission power are output as the bit numbers B$_T$ and B$_G$; and if not, the extrapolation and/or interpolation operation unit performs extrapolation and/or interpolation operations to a plurality of the bit numbers B'$_T$ and B'$_G$ calculated for the current transmission power, and outputs the extrapolation and/or interpolation operation results as the bit numbers B$_T$ and B$_G$.

The disclosure is not limited to the aforementioned exemplary embodiments, and in other embodiments, it is not necessary to search whether the reference transmission power equal to the current transmission power exists in the bit allocation look-up table, and bit allocation can be achieved through direct calculation. Namely, in the step S521, the extrapolation and/or interpolation operation unit directly calculates according to the current transmission power the bit numbers B$_T$ and B$_G$.

The disclosure is not limited to the aforementioned exemplary embodiments, and in other embodiments, it is not necessary to use the extrapolation and/or interpolation operation unit and the look-up table to obtain the bit allocation. Namely, in the step S512, it is directly found according to the current transmission power the bit numbers B$_T$ and B$_G$.

Referring to FIG. 5B, in the present exemplary embodiment, the bit allocator 66 or the bit allocator 74 has an operation unit with powerful computation capability. In the step S521, the operation unit calculates in real-time according to the current transmission power to obtain the bit numbers B$_T$ and B$_G$, where an equation used for calculating the bit numbers B$_T$ and B$_G$ is expressed as follows:

$$(B_T, B_G) = \arg\max_{\substack{(B_T, B_G): \\ B_T + B_G = B}} \Gamma_{SINR,q}(b_T, b_G, P_{max}^{dB})$$

where, $P_{max}^{dB}$ represents a current maximum transmission power, i.e., a maximum power (i.e., a current transmission power) that can be used by the transmitting end 10, currently. Generally, a sum of the powers $P_1$-$P_K$ is equal to the power $P_{max}^{dB}$. Moreover, $\Gamma_{SINR,q}(b_T, b_G, P_{max}^{dB})$ is defined as follows:

$$\Gamma_{SINR,q}(b_T, b_G, P_{max}^{dB}) = E\left\{10\log 10\left(\min_k avg(SINR_{q,quan}^{DL})/\gamma_k\right)\right\}$$

where, $avg(SINR_{q,quan}^{DL})$ represents an average of signal-to-noise ratios when the user data $x_k$ of the $k^{th}$ user is transmitted. Moreover, it should be noticed that when the signal-to-noise ratio is relatively great, only the subspace matrix T$_k$ is quantized (B$_T$=B) without quantizing the auxiliary information matrix G$_k$ (B$_G$=0). In other words, when the signal-to-noise ratio is relatively great (greater than a threshold of 20 dB), the quantized auxiliary information matrix $\hat{G}_K$ is not fed back.

In summary, the channel information feedback method and the apparatus thereof provided by the exemplary embodiments of the disclosure can be used in the MU MIMO system having the finite bit rate uplink channel, so that the transmitting end of the MU MIMO system can perform power allocation and beamforming on the user data to be transmitted to all of the users according to the fed back quantized CSI.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A channel information feedback method, adapted in a receiving end of a multiuser multiple input multiple output (MU MIMO) system, comprising:
    obtaining a subspace matrix and a magnitude matrix related to a transmitting end of the MU MIMO system according to a channel matrix corresponding to the receiving end;
    performing a first quantization on the subspace matrix to generate a quantized subspace matrix;
    performing a second quantization on an auxiliary information matrix to generate a quantized auxiliary information matrix, wherein the auxiliary information matrix is related to the magnitude matrix and a residual subspace matrix, and the residual subspace matrix has residual subspace information of the subspace matrix remained after the first quantization is performed on the subspace matrix; and
    feeding back the quantized subspace matrix and the quantized auxiliary information matrix to the transmitting end through an uplink channel.

2. The channel information feedback method as claimed in claim 1, further comprising:
    obtaining a first bit number of the quantized subspace matrix and a second bit number of the quantized auxiliary information matrix, wherein the first bit number is a quantized bit number used in the first quantization, and the second bit number is a quantized bit number used in the second quantization.

3. The channel information feedback method as claimed in claim 2, wherein the uplink channel is a finite bit rate uplink channel, and a sum of the first bit number and the second bit number is a bit number allowed to be transmitted in the finite bit rate uplink channel.

4. The channel information feedback method as claimed in claim 1, further comprising:
measurement the channel matrix; and
performing beamforming filtering on a receiving signal according to the channel matrix.

5. The channel information feedback method as claimed in claim 1, wherein the step of obtaining the subspace matrix and the magnitude matrix related to the transmitting end comprises:
decomposing the channel matrix into a first matrix related to the receiving end and a second matrix related to the transmitting end; and
decomposing the second matrix into the subspace matrix and the magnitude matrix.

6. The channel information feedback method as claimed in claim 1, wherein the step of obtaining the subspace matrix and the magnitude matrix related to the transmitting end comprises:
using at least one of a first look-up table and an extrapolation operation unit and/or an interpolation operation unit to obtain a second matrix related to the transmitting end in the channel matrix according to the channel matrix; and
decomposing the second matrix into the subspace matrix and the magnitude matrix.

7. The channel information feedback method as claimed in claim 1, wherein the step of obtaining the subspace matrix and the magnitude matrix related to the transmitting end comprises:
decomposing the channel matrix into a first matrix related to the receiving end and a second matrix related to the transmitting end; and
using at least one of a second look-up table and an extrapolation operation unit and/or an interpolation operation unit to obtain the subspace matrix and the magnitude matrix according to the second matrix.

8. The channel information feedback method as claimed in claim 1, wherein the step of obtaining the subspace matrix and the magnitude matrix related to the transmitting end comprises:
using at least one of a first look-up table and an extrapolation operation unit and/or an interpolation operation unit to obtain a second matrix related to the transmitting end in the channel matrix according to the channel matrix; and
using at least one of a second look-up table and the extrapolation operation unit and/or the interpolation operation unit to obtain the subspace matrix and the magnitude matrix according to the second matrix.

9. The channel information feedback method as claimed in claim 1, wherein the step of obtaining the subspace matrix and the magnitude matrix related to the transmitting end comprises:
using at least one of a third look-up table and an extrapolation operation unit and/or an interpolation operation unit to obtain the subspace matrix and the magnitude matrix according to the channel matrix.

10. The channel information feedback method as claimed in claim 1, wherein the step of obtaining the subspace matrix and the magnitude matrix related to the transmitting end comprises:
using a channel matrix operation unit to obtain a second matrix related to the transmitting end in the channel matrix according to the channel matrix; and
decomposing the second matrix into the subspace matrix and the magnitude matrix.

11. The channel information feedback method as claimed in claim 1, wherein the step of obtaining the subspace matrix and the magnitude matrix related to the transmitting end comprises:
decomposing the channel matrix into a first matrix related to the receiving end and a second matrix related to the transmitting end; and
using a channel matrix operation unit and a comparison operation unit to obtain the subspace matrix and the magnitude matrix according to the second matrix.

12. The channel information feedback method as claimed in claim 1, wherein the step of obtaining the subspace matrix and the magnitude matrix related to the transmitting end comprises:
using a first channel matrix operation unit and a comparison operation unit to obtain a second matrix related to the transmitting end in the channel matrix according to the channel matrix; and
using a second channel matrix operation unit and the comparison operation unit to obtain the subspace matrix and the magnitude matrix according to the second matrix.

13. The channel information feedback method as claimed in claim 1, wherein the step of obtaining the subspace matrix and the magnitude matrix related to the transmitting end comprises:
using a third channel matrix operation unit and a comparison operation unit to obtain the subspace matrix and the magnitude matrix according to the channel matrix.

14. The channel information feedback method as claimed in claim 2, wherein the step of obtaining the first bit number and the second bit number comprises:
performing an offline operation according to a plurality of reference transmission powers to generate a fourth look-up table; and
using at least one of the fourth look-up table and an extrapolation operation unit and/or a interpolation operation unit to obtain the first bit number and the second bit number according to a current transmission power of the transmitting end.

15. The channel information feedback method as claimed in claim 2, wherein the step of obtaining the first bit number and the second bit number comprises:
using a calculating unit to calculate the first bit number and the second bit number according to current transmission power of the transmitting end.

16. The channel information feedback method as claimed in claim 3, wherein when a signal-to-noise ratio is greater than a threshold, the second bit number is 0, and the first bit number is a bit number allowed to be transmitted in the finite bit rate uplink channel.

17. A channel information feedback method, adapted in a transmitting end of a multiuser multiple input multiple output (MU MIMO) system, comprising:
performing power allocation and beamforming on multiple user data to be transmitted to a plurality of users of the MU MIMO system by the transmitting end according to a plurality of quantized subspace matrices and a plurality of quantized auxiliary information matrices received from a plurality of receiving ends of the MU MIMO system, so as to generate a transmitting signal; and transmitting the transmitting signal to the receiving ends, wherein each one of the receiving ends obtains a subspace matrix and a magnitude matrix related to the transmitting end according to a channel matrix corresponding to the receiving end, and performs a first quantization and a second quantization on the subspace matrix and an auxiliary information matrix to generate a quantized subspace matrix and a quantized auxiliary information matrix, the receiving ends feed back the quantized subspace matrices and the quantized auxiliary information matrices to the transmitting end through an uplink channel, wherein the auxiliary information matrix is related to the magnitude matrix and a residual subspace matrix, and the residual subspace matrix includes residual subspace information of the subspace matrix remained after the first quantization is performed on the subspace matrix.

18. The channel information feedback method as claimed in claim 17, further comprising:
obtaining a first bit number of the quantized subspace matrix and a second bit number of the quantized auxiliary information matrix, wherein the first bit number is a quantized bit number used in the first quantization, and the second bit number is a quantized bit number used in the second quantization.

19. The channel information feedback method as claimed in claim 18, wherein the uplink channel is a finite bit rate uplink channel, and a sum of the first bit number and the second bit number is a bit number allowed to be transmitted in the finite bit rate uplink channel.

20. The channel information feedback method as claimed in claim 18, wherein the step of obtaining the first bit number and the second bit number comprises:
performing an offline operation according to a plurality of reference transmission powers to generate a look-up table; and
using at least one of the look-up table and an extrapolation operation unit and/or a interpolation operation unit to obtain the first bit number and the second bit number according to current transmission power of the transmitting end.

21. The channel information feedback method as claimed in claim 18, wherein the step of obtaining the first bit number and the second bit number comprises:
using a calculating unit to calculate the first bit number and the second bit number according to current transmission power of the transmitting end.

22. The channel information feedback method as claimed in claim 19, wherein when a signal-to-noise ratio is greater than a threshold, the second bit number is 0, and the first bit number is a bit number allowed to be transmitted in the finite bit rate uplink channel.

23. A channel information feedback apparatus, adapted in a receiving end of a multiuser multiple input multiple output (MU MIMO) system, comprising:
a transmitting end-related extractor device, configured for obtaining a subspace matrix and a magnitude matrix related to a transmitting end of the MU MIMO system according to a channel matrix corresponding to the receiving end;
a first quantizer, configured for performing a first quantization on the subspace matrix to generate a quantized subspace matrix;
a second quantizer, configured for performing a second quantization on an auxiliary information matrix to generate a quantized auxiliary information matrix, wherein the auxiliary information matrix is related to the magnitude matrix and a residual subspace matrix, and the residual subspace matrix includes residual subspace information of the subspace matrix remained after the first quantization is performed on the subspace matrix; and
a feedback signal transmitter, configured for feeding back the quantized subspace matrix and the quantized auxiliary information matrix to the transmitting end through an uplink channel.

24. The channel information feedback apparatus as claimed in claim 23, further comprising:
a bit allocator, configured for obtaining a first bit number of the quantized subspace matrix and a second bit number of the quantized auxiliary information matrix, wherein the first bit number is a quantized bit number used in the first quantization, and the second bit number is a quantized bit number used in the second quantization.

25. The channel information feedback apparatus as claimed in claim 24, wherein the uplink channel is a finite bit rate uplink channel, and a sum of the first bit number and the second bit number is a bit number allowed to be transmitted in the finite bit rate uplink channel.

26. The channel information feedback apparatus as claimed in claim 23, further comprising:
a measurement device, configured for measuring the channel matrix; and
a beamforming filter, configured for performing beamforming filtering on a receiving signal according to the channel matrix.

27. A transmitting end, adapted in a multiuser multiple input multiple output (MU MIMO) system, comprising:
a feedback signal receiver, configured for receiving a plurality of quantized subspace matrices and a plurality of quantized auxiliary information matrices fed back by a plurality of receiving ends of a plurality of users of the MU MIMO system through an uplink channel;
a power allocation device, configured for performing power allocation on multiple user data to be transmitted to the users of the MU MIMO system by the transmitting end according to the quantized subspace matrices and the quantized auxiliary information matrices; and
a beamforming device, configured for performing beamforming on the multiple user data which are power-allocated according to the quantized subspace matrices and the quantized auxiliary information matrices, so as to generate a transmitting signal to the receiving ends, wherein each one of the receiving ends obtains a subspace matrix and a magnitude matrix related to the transmitting end according to a channel matrix corresponding to the receiving end, and performs a first quantization and a second quantization on the subspace matrix and an auxiliary information matrix to generate a quantized subspace matrix and a quantized auxiliary information matrix, the receiving ends feed back the quantized subspace matrices and the quantized auxiliary information matrices to the transmitting end through the uplink channel, wherein the auxiliary information matrix is related to the magnitude matrix and a residual subspace matrix, and the residual subspace matrix has residual subspace information of the subspace matrix remained after the first quantization is performed on the subspace matrix.

28. The transmitting end as claimed in claim 27, further comprising:
a bit allocator, configured for obtaining a first bit number of the quantized subspace matrix and a second bit number of the quantized auxiliary information matrix, wherein the first bit number is a quantized bit number used in the first quantization, and the second bit number is a quantized bit number used in the second quantization.

29. The channel information feedback apparatus as claimed in claim 28, wherein the uplink channel is a finite bit rate uplink channel, and a sum of the first bit number and the second bit number is a bit number allowed to be transmitted in the finite bit rate uplink channel.

30. A multiuser multiple input multiple output (MU MIMO) system, comprising:
  a plurality of receiving ends, corresponding to a plurality of users of the MU MIMO system, wherein each one of the receiving ends comprises a channel information feedback apparatus, and the channel information feedback apparatus comprises:
    a transmitting end-related extractor device, configured for obtaining a subspace matrix and a magnitude matrix related to a transmitting end of the MU MIMO system according to a channel matrix corresponding to the receiving end;
    a first quantizer, configured for performing a first quantization on the subspace matrix to generate a quantized subspace matrix;
    a second quantizer, configured for performing a second quantization on an auxiliary information matrix to generate a quantized auxiliary information matrix, wherein the auxiliary information matrix is related to the magnitude matrix and a residual subspace matrix, and the residual subspace matrix includes residual subspace information of the subspace matrix remained after the first quantization is performed on the subspace matrix; and
    a feedback signal transmitter, configured for feeding back the quantized subspace matrix and the quantized auxiliary information matrix to the transmitting end through an uplink channel; and
  the transmitting end, comprising:
    a feedback signal receiver, configured for receiving the quantized subspace matrix and the quantized auxiliary information matrix through the uplink channel;
    a power allocation device, configured for performing power allocation on multiple user data to be transmitted to the users of the MU MIMO system by the transmitting end according to the quantized subspace matrices and the quantized auxiliary information matrices;
    a beamforming device, configured for performing beamforming on the multiple user data which are power-allocated according to the quantized subspace matrices and the quantized auxiliary information matrices, so as to generate a transmitting signal to the receiving ends.

31. The MU MIMO system as claimed in claim 30, wherein the channel information feedback apparatus and/or the transmitting end further comprises:
  a bit allocator, configured for obtaining a first bit number of the quantized subspace matrix and a second bit number of the quantized auxiliary information matrix, wherein the first bit number is a quantized bit number used in the first quantization, and the second bit number is a quantized bit number used in the second quantization.

32. The MU MIMO system as claimed in claim 31, wherein the uplink channel is a finite bit rate uplink channel, and a sum of the first bit number and the second bit number is a bit number allowed to be transmitted in the finite bit rate uplink channel.

33. The MU MIMO system as claimed in claim 30, wherein the channel information feedback apparatus further comprises:
  a measurement device, configured for measuring the channel matrix; and
  a beamforming filter, configured for performing beamforming filtering on a receiving signal according to the channel matrix.

\* \* \* \* \*